United States Patent

Doerr

Patent Number: 5,845,022
Date of Patent: Dec. 1, 1998

[54] DOUBLE-CHIRPED WAVEGUIDE GRATING ROUTER WITH ANGLED PORTS

[76] Inventor: Christopher Richard Doerr, 1000 Oaks Dr., Apt. 99, Atlantic Highlands, N.J. 07716

[21] Appl. No.: 800,946

[22] Filed: Feb. 14, 1997

[51] Int. Cl.⁶ ....................................................... G02B 6/28
[52] U.S. Cl. .................................. 385/24; 385/37; 385/46
[58] Field of Search ................................. 385/24, 37, 46, 385/14, 15

[56] References Cited

U.S. PATENT DOCUMENTS

| 5,136,671 | 8/1992 | Dragone | 385/46 |
| 5,339,157 | 8/1994 | Glance et al. | 385/24 |

Primary Examiner—John Ngo

[57] ABSTRACT

An improved waveguide grating router occupies less physical volume than prior-art designs, and provides a spectral response with substantially one dominant passband, by providing nonlinearly-changing angles between the central axis of a waveguide coupler and each of a plurality of waveguide arms, and by providing waveguide arms having nonlinearly-changing lengths. The router includes a first waveguide coupler, a second waveguide coupler, and a plurality of M waveguides coupled between the first and second waveguide couplers. Each waveguide m has a length L(m) and forms an angle α(m) with respect to the central axis of the second waveguide coupler. The difference in angle (Δα) between any two adjacent waveguides, m and (m−1) is equal to an arbitrary constant j plus (B*m) for each of the waveguides. The difference in length (ΔL) between any two adjacent waveguides, m and (m−1), is equal to an arbitrary constant k plus (A*m) for each of the waveguides. Values of A and B are selected such that, for each of a plurality of waveguides, the transmissivity of a dominant passband selected from a plurality of passbands is enhanced.

7 Claims, 2 Drawing Sheets

DOUBLE-CHIRPED WAVEGUIDE GRATING ROUTER WITH ANGLED PORTS

BACKGROUND OF THE INVENTION

1. Field of the Invention

This invention relates generally to optical transmission, and more specifically to techniques for controlling optical signals in waveguide grating routers.

2. Background of Related Art

State-of-the-art optical transmission systems often utilize waveguide grating routers. In general, waveguide grating routers are arranged in the form of M grated waveguides (i.e. "arms") of varying lengths L(m), connected between two waveguide couplers. A first waveguide coupler provides $N_1$ inputs and a second waveguide coupler provides $N_2$ outputs. The router includes a set of input ports p at the first waveguide coupler and a set of output ports q at the second waveguide coupler. The router performs filtering for each input-output port (p-q) combination. If the q ports are terminated with an array of N amplifiers and mirrors, and the p ports are terminated with mirrors and optical amplifiers, a multi-frequency laser (MFL) oscillating at N precisely-spaced frequencies is provided. One example of a waveguide grating router is disclosed in U.S. Pat. No. 5,136,671 (the '671 patent), issued to C. Dragone, and incorporated by reference herein.

The frequency spectrum of existing waveguide grating routers presents some shortcomings. Consider the frequency spectrum of one type of existing waveguide grating router design where the difference in length ($\Delta L$) between any two adjacent waveguides is substantially constant. Within the frequency passband of each channel, a plurality of evenly-spaced frequency components, each at roughly the same peak power level, will occur. The spacing of these frequency components is determined by the router's free-spectral range. For a multi-frequency laser (MFL), in some of the channels, the net power gain may be nearly the same for two or more of these frequency components, especially if the optical amplifiers connected to the MFL router all have substantially similar characteristics. This repetition of the same signal at several different frequencies within each channel results in multimode lasing of an optical laser, producing instabilities in the laser's output. The ratio of the dominant passband to undesired spectral components is insufficiently high.

The shape and configuration of existing waveguide grating routers may result in an inefficient use of physical space. For example, the distance between the first and second waveguide couplers is a significant factor in determining the overall volume occupied by the coupler. To the extent possible, it would be desirable to reduce the required distance between the first and second waveguide couplers so as to provide a router having reduced physical dimensions.

A waveguide grating router having a dominant passband (i.e. one predominant frequency component) is highly desirable. The amplitude of the dominant passband should be as high as possible relative to undesired passbands. In addition, it is desirable to control the particular frequency or passband at which the peak signal occurs within each channel. Note that, as used herein, the term "frequency" may denote a signal having a single frequency, or a signal occupying a given range of frequencies, i.e., a signal passband.

SUMMARY OF THE INVENTION

An improved waveguide grating router occupies less physical volume than prior-art designs, and provides a spectral response with substantially one dominant passband, by providing angles between the central axis of a waveguide coupler and each of a plurality of waveguides that change monotonically from waveguide to waveguide, and by providing waveguide arms each having a length that changes monotonically from waveguide to waveguide. The router includes a first waveguide coupler, a second waveguide coupler, and a plurality of waveguides M=[1 . . . M] coupled between the first and second waveguide couplers. Each waveguide has a length L(m) and forms an angle $\alpha(m)$ with respect to the central axis of the second waveguide coupler. The difference in angle $\Delta\alpha_{m,\ m-1}$ between any two adjacent waveguides, m and (m-1) is equal to an arbitrary constant j plus (B*m) for each of the waveguides. The difference in length ($\Delta L$) between any two adjacent waveguides, m and (m-1), is equal to an arbitrary constant k plus (A*m) for each of the waveguides. Values of A and B are selected such that, for each of a plurality of waveguides, the transmissivity of a dominant passband selected from a plurality of passbands is enhanced.

BRIEF DESCRIPTION OF THE DRAWINGS

The invention, together with its various features and advantages can be readily understood from the following more detailed description taken in conjunction with the accompanying drawings in which.

DETAILED DESCRIPTION

Figure 1:
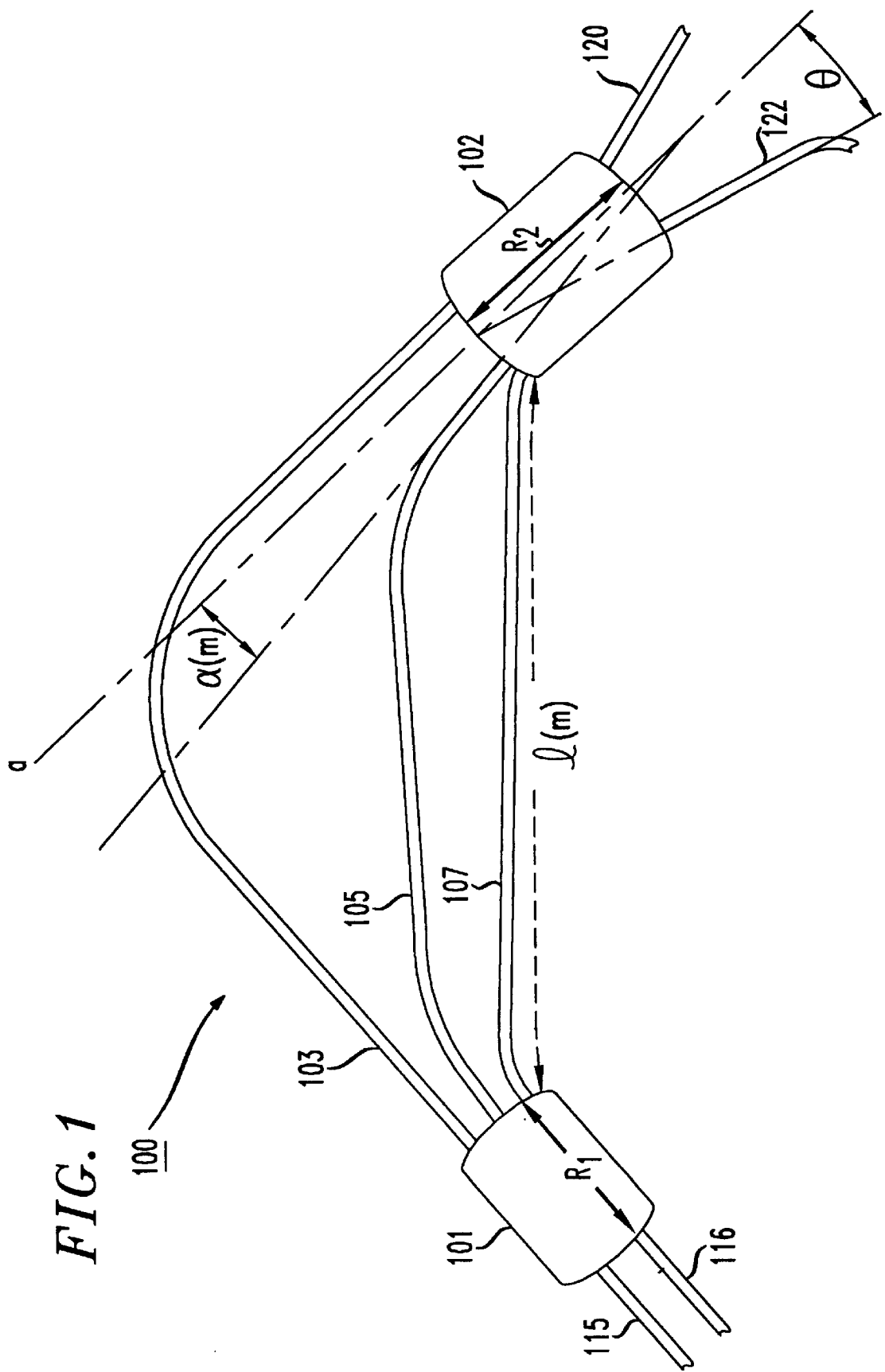
FIG. 1 illustrates a waveguide grating router constructed in accordance with a first embodiment of the invention.

FIG. 1 illustrates a waveguide grating router constructed in accordance with a first embodiment of the invention, such that the angle between each of a plurality of respective waveguides and a waveguide coupler is determined in accordance with a first monotonically-increasing or monotonically-decreasing function, and the length differences of each of a plurality of respective waveguides are determined in accordance with a second monotonically-increasing or monotonically-decreasing function.

Referring to FIG. 1, a first waveguide coupler 101 and a second waveguide coupler 102 are used in a waveguide grating router 100. The waveguide grating router includes a plurality of waveguide grating arms 103, 105, 107 coupled between the first waveguide coupler 101 and the second waveguide coupler 102. A plurality of input ports 115, 116 are coupled to the first waveguide coupler 101, and a plurality of output ports 120, 122 are coupled to the second waveguide coupler 102.

The waveguide terminations of input and output ports 115, 116, 120, 122 function as if they include lenses. The focal lengths of these lenses are represented by distances $R_1$ and $R_2$, for first waveguide coupler 101 and second waveguide coupler 102, respectively. The number of waveguide grating arms, denoted by M, is generally assumed to be much greater than 1. The waveguide couplers 101, 102 each have a propagation constant, k, and the M waveguide grating arms 103, 105, 107 each have a propagation constant β. The mth waveguide grating arm has a length represented by L(m). A waveguide grating arm 105 enters the free-space region of waveguide coupler 102, mathematically denoted as waveguide coupler i, at an angle denoted by $\alpha_i(m)$, with reference to a central axis a-a' of waveguide coupler 102. An output port 122 exits the free-space region of waveguide coupler 102 at an angle θ, with reference to the central axis a-a' of waveguide coupler 102. The angle θ could, but need not, be set such that each output port 120, 122 exits the free-space region substantially perpendicular to the arced surface of second coupler 102.

If the lengths of the waveguide grating arms 103, 105, 107 are substantially identical, or if there is a constant difference between the lengths of each pair of adjacent waveguide grating arms, this is referred to as a nonchirped waveguide grating router. The lengths of respective waveguide grating arms varies as a linear function of waveguide number m. For such a nonchirped router, $L(m)=m\Delta L+\text{constant}$, and $\alpha_i(m) = [m-(M+1)/2]\Delta\alpha_i$, where $\Delta L$ and $\Delta\alpha_i$ are designer-chosen constants. In such a case, the phase front of the lightwave at the end of the grating arms tilts linearly with β. Every time the phase front goes through a tilt of $2\pi$, the transmissivity transfer function for each port repeats. This situation may be visualized with reference to FIG. 2A, where each of the spectral components (shown as sets of passbands 201, is 203, 205, 207, 209, 211) have substantially the same amplitude. However, for purposes of the present application, only one dominant set of passbands per port 120 is desired, depicted, for example, as the set of passbands 207 of FIG. 2A.

Unwanted sets of passbands may be suppressed with respect to dominant set of passbands 207 (FIG. 2A) by providing specified length differences between the various waveguide grating arms 103, 105, 107 (FIG. 1) according to any predetermined mathematical function that provides increasing or decreasing waveguide length differences. In other words, the lengths of respective waveguide grating arms varies as a non-linear function of waveguide number m. One illustrative example of such a mathematical relationship applies a parabolic function to the length differences among each of a plurality of waveguide grating arms. The difference in length ($\Delta L$) between any two adjacent waveguides, m and (m−1), is equal to an arbitrary constant plus (A*m) for each of the waveguides. Mathematically, this may be expressed as $\Delta L=\{L(m)-L(m-1)\}=k+A*(m)$, where k is an arbitrary constant, m denotes a given waveguide out of a total M waveguides, and A is a positive or negative real number. In this manner, the length L(m) of the waveguide arms is a nonlinear increasing or decreasing function of m; e.g., a parabolic function of m.

An even more specific mathematical relationship for providing parabolic chirp of the waveguide grating arms is given as:

$$L(m) = \text{round}\left\{\left[m+\gamma\left(\frac{m-\frac{M+1}{2}}{1-\frac{M+1}{2}}\right)^2\right]\frac{\Delta L\beta_c}{2\pi}\right\}\frac{2\pi}{\beta_c} + \text{constant} \quad (1)$$

In the above equation, γ represents a constant whose value determines the amount of chirp. The dominant passbands are centered at $\beta=\beta_c$ with grating order $\Delta L\beta_c/(2\pi)$. Neglecting overall phase shift, the phase shift upon passing through a 1-dimensional thin lens of focal length f is $-kx^2/(2f)$, where x is the dimension along the lens. The phase shift encountered in the grating arms is $\beta L(m)$. If the β term is expanded to equal $(\beta_c+\Delta\beta)$, then the parabolic chirp is equivalent to placing a lens of focal length $$f_c = \frac{-k\left[R\Delta\alpha\left(1-\frac{M+1}{2}\right)\right]^2}{2\gamma\Delta\beta\Delta L} \quad (2)$$

next to the waveguide grating arms 103, 105, 107, 109, 111.

The overall focal length f of two thin lenses of focal lengths $f_1$ and $f_2$ placed next to one another is given by $(1/f)=(1/f_1)+(1/f_2)$. This mathematical expression is generally known as the lens maker's formula. Thus, the overall focal length of the grating arms is $(1/f)=(1/R)+(1/f_c)$. Defining $f\equiv R+d$, where d is the offset of the focus from R, then $$d = R\frac{2\gamma\Delta\beta\Delta L}{kR\left[\Delta\alpha\left(1-\frac{M+1}{2}\right)\right]^2 - 2\gamma\Delta\beta\Delta L} = R\frac{R\gamma\theta}{\Delta\alpha\left(1-\frac{M+1}{2}\right)^2 - 2\gamma\theta} \quad (3)$$

where the second equals sign holds true for the $\Delta L\beta_c(2\pi)$ grating order. θ is the input/output port angle where the light is focused, given by $\theta=\Delta\beta\Delta L(kR\Delta\alpha)$.

The effect of applying parabolic chirp to the arm lengths is now readily apparent. The focal length of the lightwave from the arms changes with wavelength. For a standard free space, this implies that the lightwave is in focus for $\beta=\beta_c$. The wave is gradually defocused as β departs from the value, $\beta_c$. However, if the entrance location of each port waveguide is adjusted radially so as to be in focus, essentially nonchirped performance is achieved for one grating order, along with strong defocusing for other grating orders.

The arm lengths in the waveguide grating router are chirped so as to cause the transmissivity of the router to have one set of dominant passbands for each input-output port combination, with the peak transmissivities in adjacent grating orders suppressed. This suppression is useful for controlling the oscillation frequencies of multifrequency waveguide grating lasers and for reducing the spontaneous emission beat noise in preamplified waveguide grating receivers. However, for high unwanted grating order suppression, when only the arm lengths are chirped, the passband peak transmissivities are constrained to following a smooth, continuously-and gradually-changing envelope as the input-output port combination is changed.

Although chirping only the arm lengths of the waveguide grating router allows each input-output port combination to have a dominant set of passbands in one grating order with the peak transmissivities in other orders suppressed, the resulting spectral response is suboptimal. The dominant set of passbands has a reduced peak transmissivity and an increased spectral width, while suppression of undesired spectral components (other passband sets resulting from extraneous grating orders) is limited. The resulting spectral response is shown in FIG. 2B. The desired dominant set of passbands, spectral component 307, is at a higher amplitude than other spectral components 301, 303, 305, 309, 311. However, note that two spectral components 305, 309 are nearly as strong as the desired spectral component 307. Moreover, the remaining undesired spectral components 301, 303, and 311 have amplitudes which are only several decibels below that of the desired spectral component 307.

Chirping both the arm lengths and the angular distribution of the arms at one of the free-space regions of a waveguide coupler eliminates the foregoing deficiencies as revealed by FIG. 2B. Consider again the example of FIG. 1. For a waveguide grating router 100 consisting of two waveguide couplers 101, 102 of radii $R_1$ and $R_2$, respectively, joined by M waveguides 103, 105, 107 with lengths L(m) and propagation constant β which enter the free-space regions of couplers 101 and 102 with propagation constant k at angles $\alpha_1(m)$ and $\alpha_2(m)$, respectively, the amplitude transmissivity from a port on coupler 101 at an angle equal to $\theta_1$, to a port at an angle $\theta_2$ on coupler 102 is $$t(\theta_1, \theta_2) = \sum_{m=1}^{M} \alpha_1(m, \theta_1)\alpha_2(m, \theta_2)\exp\{j[\beta L(m) - kR_1\alpha_1(m)\theta_1 - kR_2\alpha_2(m)\theta_2]\} \quad (4)$$

where $$\alpha_i(m, \theta_i) = \frac{\left|\left\{\int_{-\infty}^{\infty} u(x)\exp[jkx\alpha(m)]dx\right\}\left\{\int_{-\infty}^{\infty} v_i(m, x)\exp(jkx\theta_i)dx\right\}\right|}{\sqrt{\frac{2\pi R_i}{k}\left[\int_{-\infty}^{\infty}|u_i(x)|^2 dx\right]\left[\int_{-\infty}^{\infty}|v_i(m, x)|^2 dx\right]}} \quad (5)$$

for α, θ<<1. u is the field produced at the free-space end of a port waveguide by exciting the port at $\theta_i$, and v is the field produced at the free-space end of a grating arm by exciting grating arm m.

Let $\beta=\beta_0+\Delta\beta$ and $k=k_0+\Delta k$. If we constrain $\Delta kR\alpha\theta<<2\pi$, then (4) can be written as $$t(\theta_1, \theta_2) = \sum_{m=1}^{M} \alpha_1(m, \theta_1)\alpha_2(m, \theta_2) \quad (6)$$

$$\exp[j\beta_0 L(m)]\exp\{j[\Delta\beta L(m) - k_0 R_1\alpha_1(m)\theta_1 - k_0 R_2\alpha_2(m)\theta_2]\}$$

If $\alpha_i(m)=[m-(M+1)/2]\cdot\Delta\alpha_i$, where $\Delta\alpha_i$ is a constant, this equation represents the usual transmissivity for a router with only the path lengths chirped. The drawback to chirping only the path lengths is that a change in θ adds a linear phase shift across m, which by definition of the chirp, can only be fully compensated at certain values of Δβ. However, if $$\alpha_i(m) = \frac{s_i L(m)}{k_0 R_i} + \text{constant} \quad (7)$$

in which $s_i$ is a constant equal to a desired $\Delta\beta/\theta_i$, then, ignoring overall phase shifts, (6) becomes $$t(\theta_1, \theta_2) = \sum_{m=1}^{M} \alpha_1(m, \theta_1)\alpha_2(m, \theta_2)\exp[j\beta_0 L(m)]\exp[jL(m)(\Delta\beta - s_1\theta_1 - s_2\theta_2)] \quad (8)$$

Thus, by making α(m+1)−α(m) proportional to L(m+1)−L(m) for all m, this equation represents a demultiplexer whose phase part of the transmissivity remains constant except for a shift of $\Delta\beta=s_i\theta_i$ around $\beta_0$ as θ changes for any set of L(m). The expression $$\alpha_i(m) = \frac{s_i L(m)}{k_0 R_i} + \text{constant} \quad (9)$$

can be further simplified to yield:

$$\alpha_i(m) = [\{(\text{a first constant})^* L(m)\} + (\text{a second constant})].$$

Consider a specific example, an 1×N device, where $\theta_1$ is set to 0, and all of the subscripts are dropped. In such a case, only the N-port free-space needs to be chirped. The chirp design that allows us to control the center propagation constant $\beta_c$ and grating order $\Delta L\beta_c/(2\pi)$ (ΔL is a constant) of the dominant passbands is $$L(m) = \text{round}\left\{[m+g(m)]\frac{\Delta L\beta_c}{2\pi}\right\}\frac{2\pi}{\beta_c} + \text{constant} \quad (10)$$

in which g(m) is an arbitrary function. From (7), the chirp for the array free-space region is:

$$\alpha(m) = \Delta\alpha\left\{\text{round}\left\{[m+g(m)]\frac{\Delta L\beta_c}{2\pi}\right\}\frac{2\pi}{\Delta L\beta_c} - \frac{M+1}{2}\right\} \quad (11)$$

Δα is the angular spacing between the grating waveguides if the free-space were unchirped. Note that rounding is actually not necessary for α(m), and can be removed from (7).

The g(m) that gives a large and consistent extraneous passband extinction ratio is the M-grating, or what we now call the parabolic, chirp design: $g(m)=\gamma\{\{[m-(M+1)/2][1-(M+1)/2]\}^2-\frac{1}{3}\}$. Parabolic chirp corresponds to a linear increase in increment, and so to have the highest transmissivity, the grating waveguides get wider (or narrower if γ<0) in a linear fashion going from the shortest to the longest arm. Note that the coupler 102 of FIG. 1 has a free-space region with a positive parabolic chirp. The −⅓ in the expression for g(m) was found empirically and maximizes the overlap of the effective modes in the grating arms 103, 105, 107 from the two free spaces.

The term "parabolic chirp", as applied to angular offsets, means that each waveguide m has a length L(m) and forms an angle α(m) with respect to the central axis of the second waveguide coupler. The difference in angle Δα between any two adjacent waveguides, m and (m−1) is equal to an arbitrary constant j plus (B*m) for each of the waveguides. The advantages of parabolically chirping the angles in this manner are more fully realized if the lengths of the waveguide arms are also chirped, such that the difference in length (ΔL) between any two adjacent waveguides, m and (m−1), is equal to an arbitrary constant k plus (A*m) for each of the waveguides. Values of A and B are selected such that, for each of a plurality of waveguides, the transmissivity of a dominant passband selected from a plurality of passbands is enhanced.

Figure 2A:
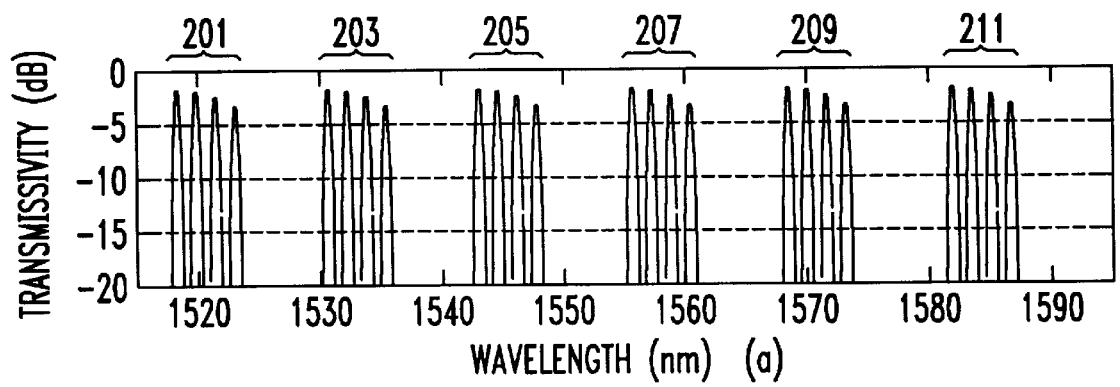
FIGS. 2A, 2B, and 2C show illustrative spectral output plots for, respectively, a prior art router, a router having chirped arm lengths, and a router having both chirped waveguide arm lengths and waveguide arms positioned at chirped angular offsets.
Figure 2B:
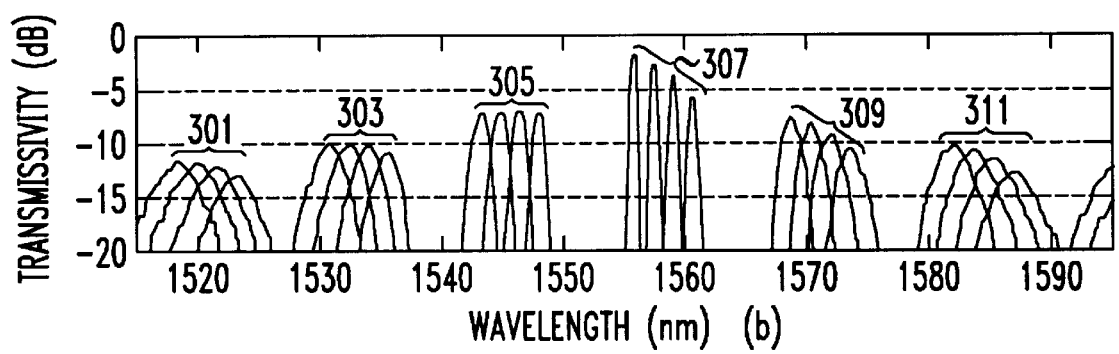
Figure 2C:
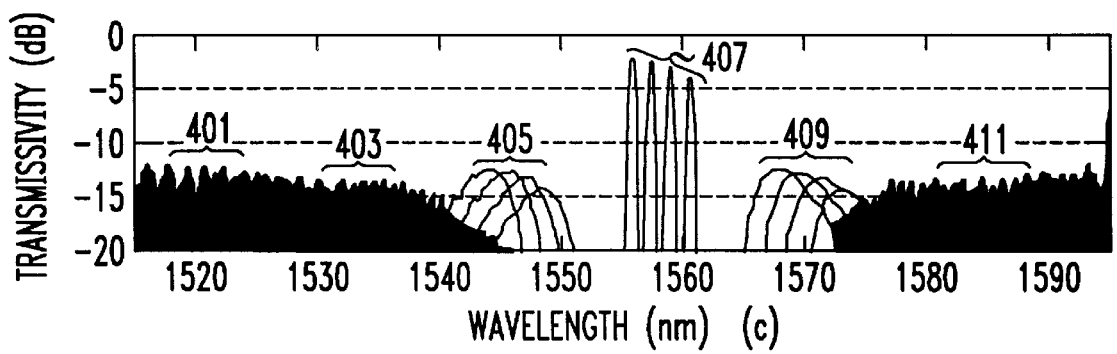

FIG. 2C shows an illustrative spectral response for a waveguide grating router having chirped angular offsets and chirped arm lengths. The desired dominant passband, spectral component 407, is at a much higher amplitude than other spectral components 401, 403, 405, 409, 411. The two spectral components 405, 409 nearest in frequency to the desired spectral component 407 are of much lower amplitude than the desired spectral component 407. Moreover, the remaining undesired spectral components 401, 403, and 411 have amplitudes which are so low as to be barely discernible.

The decrease in transmissivity of the dominant passband, spectral component 407, for the double-chirped case is only 0.09 dB over that of the non- and single-chirped cases (spectral components 207 and 307, respectively). Although increasing γ further increases the suppression of the passbands in the neighboring grating orders, it also decreases the suppression in the further orders. It was found empirically that the flattest passband suppression is achieved with γ≈M/8.

The plots of FIGS. 2A, 2B, and 2C were prepared using Eq. (1). FIG. 2A represents the theoretical spectral response of a nonchirped router (γ=0), FIG. 2B shows the theoretical spectral response of a single-parabolic-chirped router (i.e., only the arm lengths are chirped) with $\gamma=1.1$ (the value for optimum extinction ratio in a single-chirped router), and FIG. 2C shows the theoretical spectral response of a double-parabolic chirped router (i.e., both the arm lengths and angles are chirped) with $\gamma=3.9$. M=32, N=8 channel spacing=200 GHz, waveguide index step $\Delta n/n=0.0080$, index n=3.25 (at 1.555 mm wavelength), spacing between grating arms at the free-space=0.8 mm, $\Delta\alpha=0.19/M$, the ratio of grating arm waveguide width to period at the free-space=0.86, and the port waveguide width at the free-space=2.0 mm. The grating arms narrow down after leaving the free-space, so v is approximated to be a linear combination of the planar fundamental modes of a grating waveguide and its neighbors at the free-space such that neighboring modes are orthogonal.

Output ports 120, 122 may, but need not, be positioned at an angle substantially perpendicular to the curved surface of coupler 102. As a general matter, the amplitude transmissivity of a waveguide port 120 excited at an angle $\theta_1$ is free-space-offset radially by $d_1$, and a waveguide port 122 excited at an angle $\theta_2$ in free-space is offset radially by $d_2$ according to the relationship $$t(\theta_1, \theta_2) = \sum_{m=1}^{M} \alpha_1(m, \theta_1)\alpha_2(m, \theta_2) \quad (12)$$

$$\exp\left\{ j \left\{ \beta L(m) - kR_1\alpha_1(m) \left\{ \theta_1 + \frac{d_1(\theta_1)\alpha_1(m)}{2[R_1 + d_1(\theta_1)]} \right\} - kR_2\alpha_2(m) \left\{ \theta_2 + \frac{d_2(\theta_2)\alpha_2(m)}{2[R_2 + d_2(\theta_2)]} \right\} \right\} \right\}$$

where the possibility of waveguides offset from two circles each containing the center of the other, $$\alpha_i(m, \theta) = \frac{\left| \left\{ \int_{-\infty}^{\infty} u_i(\theta_i, x)\exp\left[ jkx\frac{R_i\alpha_i(m)}{R_i + d_i(\theta_i)} \right] dx \right\} \left\{ \int_{-\infty}^{\infty} v_i(m, x)\exp\left\{ jkx\left[ \theta_i + \frac{d_i(\theta_i)\alpha_i(m)}{R_i + d_i(\theta_i)} \right] \right\} dx \right\} \right|}{\sqrt{\frac{2\pi[R_i + d_i(\theta_i)]}{k}\left[ \int_{-\infty}^{\infty} |u_i(\theta_i, x)|^2 \right]\left[ \int_{-\infty}^{\infty} |v_i(m, x)|^2 dx \right]}} \quad (13)$$

for $\alpha,\theta \ll 1$. $u_i$ is the field produced at the free-space end of a port waveguide by exciting the port at $\theta_i$, and $v_i$ is the field produced at the free-space end of a grating arm by exciting grating arm m.

In the waveguide grating multifrequency laser, for many applications one would like to have as narrow a passband as possible in order to achieve single mode oscillation and/or a well-confined oscillation wavelength. Assuming that one wishes to keep the number of channels and their spacing the same, the most straightforward way to decrease the passband width is to increase M. However, increasing M increases both the area covered by the grating and the lengths of the free-space regions. One method that trades free-space length for loss is to decrease the equivalent free spectral range but maintain the same channel spacing by increasing the $\Delta\theta$ between outputs. However, to ensure high peak transmissivity for all the channels, the ratio of grating waveguide width to period at the free-space must be decreased, increasing the device loss.

In conclusion, double-chirping the waveguide grating router allows the designer to have a constant-phase router transfer function for all of the channels in a specified grating order.

What is claimed is:

1. An apparatus for guiding optical signals, comprising a first waveguide coupler, a second waveguide coupler having a central axis, and a plurality of m waveguides coupled between the first and second waveguide couplers; each of respective m waveguides having a length L(m), such that the difference in length $\Delta L$ between any two adjacent waveguides, m and (m−1), is substantially equal to an arbitrary constant k plus (A*m) for each of the waveguides, A representing a real number, wherein the length L(m) of the waveguide arms is a nonlinear function of m;

each of respective m waveguides forming an angle $\alpha(m)$ with respect to the central axis of the second waveguide coupler, such that the difference in angle $\Delta\alpha$ between any two adjacent waveguides, m and (m−1) is substantially equal to an arbitrary constant j plus (B*m) for each of the waveguides, B representing a real number, wherein angle $\alpha_m$ is a nonlinear function of m, and whereby the transmissivity of a dominant passband selected from a plurality of passbands is enhanced.

2. The apparatus of claim 1 further comprising first and second output ports coupled to the second waveguide coupler, wherein values for A and B are selected so as to enhance transmissivity of a first dominant passband at the first output port and a second dominant passband at the second output port.

3. The apparatus of claim 2 having a center propagation constant denoted as $\beta_c$, a grating order $\Delta L\beta_c/(2\pi)$ wherein $\Delta L$ is a constant, and wherein the lengths of respective waveguides is substantially calculated from $$L(m) = \text{round}\left\{ [m + g(m)]\frac{\Delta L\beta_c}{2\pi} \right\}\frac{2\pi}{\beta_c} + \text{(an arbitrary constant)}$$

wherein g(m) represents an arbitrary function, and "round" represents a function that rounds the value of its argument to an integer.

4. The apparatus of claim 3 wherein the angular positions of each of respective m waveguides is substantially determined from the following mathematical relationship:

$$\alpha(m) = \Delta\alpha\left[ m + \epsilon g(m) - \frac{M+1}{2} \right]$$

such that $\Delta\alpha$ represents an arbitrarily-selected constant angular spacing between each of respective waveguides and ($\epsilon$) is an arbitrary constant.

5. The apparatus of claim 4 wherein the focal length of the first output port is determined such that the transmissivity of a dominant passband selected from a plurality of passbands is enhanced.

6. The apparatus of claim 4 wherein the focal lengths of the first and second output ports are determined such that the transmissivity of a dominant passband selected from a plurality of passbands is enhanced.

7. A method of guiding optical signals including the following steps:
(a) providing a first waveguide coupler and a second waveguide coupler, the second waveguide coupler having a central axis;
(b) coupling a plurality of m waveguides between the first and second waveguide couplers, each of respective m waveguides having a length $L(m)$, wherein $L(m)$ is a nonlinear function of m; and
(c) each of the m respective waveguides forming an angle $a(m)$ with the central axis of the second coupler, wherein $\alpha(m)$ is substantially equal to $B*L(m)+C$, where B and C are constants.

* * * * *